United States Patent [19]

Bradbury et al.

[11] Patent Number: 5,221,525
[45] Date of Patent: Jun. 22, 1993

[54] SOLVENT EXTRACTION OF GALLIUM FROM ACIDIC SOLUTIONS CONTAINING PHOSPHORUS

[75] Inventors: James A. Bradbury; Michael E. Coleman, both of Spokane; Susan D. Roberts, Mazama, all of Wash.

[73] Assignee: N. A. Degerstrom, Inc., Spokane, Wash.

[21] Appl. No.: 821,764

[22] Filed: Jan. 14, 1992

Related U.S. Application Data

[63] Continuation-in-part of Ser. No. 692,246, Apr. 26, 1991, abandoned.

[51] Int. Cl.$^5$ ............................................. C01G 15/00
[52] U.S. Cl. ............................ 423/112; 423/DIG. 14; 75/722
[58] Field of Search ............... 423/DIG. 14, 112, 299, 423/100, 138, 89; 75/722, 743

[56] References Cited

U.S. PATENT DOCUMENTS

| | | | |
|---|---|---|---|
| 3,971,843 | 7/1976 | Helgorsky et al. | 423/112 |
| 4,169,130 | 9/1979 | Helgorsky et al. | 423/112 |
| 4,241,029 | 12/1980 | Helgorsky et al. | 423/112 |
| 4,485,076 | 11/1984 | Bauer et al. | 423/112 |
| 4,559,203 | 12/1985 | Bauer et al. | 423/112 |
| 4,666,686 | 5/1987 | Krajewski et al. | 423/89 |
| 4,698,429 | 11/1987 | Kokko et al. | 546/179 |
| 4,724,129 | 2/1988 | Helgorsky et al. | 423/112 |
| 4,741,887 | 5/1988 | Coleman et al. | 423/112 |
| 4,844,808 | 7/1989 | Sabot et al. | 210/634 |
| 4,855,114 | 8/1989 | Gefvert | 423/112 |
| 4,865,824 | 9/1989 | Pfuller | 423/112 |
| 4,942,023 | 7/1990 | De Schepper et al. | 423/22 |
| 4,943,420 | 7/1990 | Mitschker et al. | 423/112 |

FOREIGN PATENT DOCUMENTS

| | | |
|---|---|---|
| 0102882 | 3/1984 | European Pat. Off. |
| 2743475 | 3/1978 | Fed. Rep. of Germany |
| WO90/13677 | 11/1990 | PCT Int'l Appl. |

OTHER PUBLICATIONS

Leveque et al., "The Recovery of Gallium from Bayer Process Aluminate Solutions by Liquid-Liquid Extraction," CIM Special vol. 21, Date Unknown.

Sato et al., "The Extraction of Some Metals From Alkaline Solutions By Alkylated Hydroxyquinoline," Date Unknown.

Judd et al., "Gallium Solvent Extraction From Sulfuric Acid Solutions Using OPAP," presented at the SME Annual Meeting, Salt Lake City, Utah, 1990 (month unknown).

*Primary Examiner*—Theodore Morris
*Assistant Examiner*—Edward Squillante
*Attorney, Agent, or Firm*—Wells, St. John, Roberts, Gregory & Matkin

[57] ABSTRACT

A process for extracting gallium from an aqueous gallium-bearing acidic solution comprises: a) providing a quantity of phosphorus within the aqueous gallium-bearing solution, the phosphorus being provided in an aqueous soluble form and being substantially dissolved within the aqueous solution, the aqueous gallium-bearing solution having dissolved phosphorus defining a first aqueous phase; b) intermixing the aqueous gallium-bearing solution having the quantity of aqueous soluble dissolved phosphorus with a first organic phase comprising a quantity of an alkylated 8-hydroxyquinoline; c) separating the intermixed first aqueous phase and first organic phases into a second aqueous phase and a second organic phase, the quantities of aqueous soluble phosphorus and alkylated 8-hydroxyquinoline being effective to extract gallium from the aqueous gallium-bearing solution to provide a gallium concentration in the second organic phase which is greater than a gallium concentration in the first organic phase and to provide a gallium concentration in the second aqueous phase which is less than a gallium concentration in the first aqueous phase, the gallium concentration in the second organic phase being greater than if no aqueous soluble phosphorus were present in the first aqueous solution; and d) stripping gallium from the second organic phase with an acid solution.

22 Claims, 1 Drawing Sheet

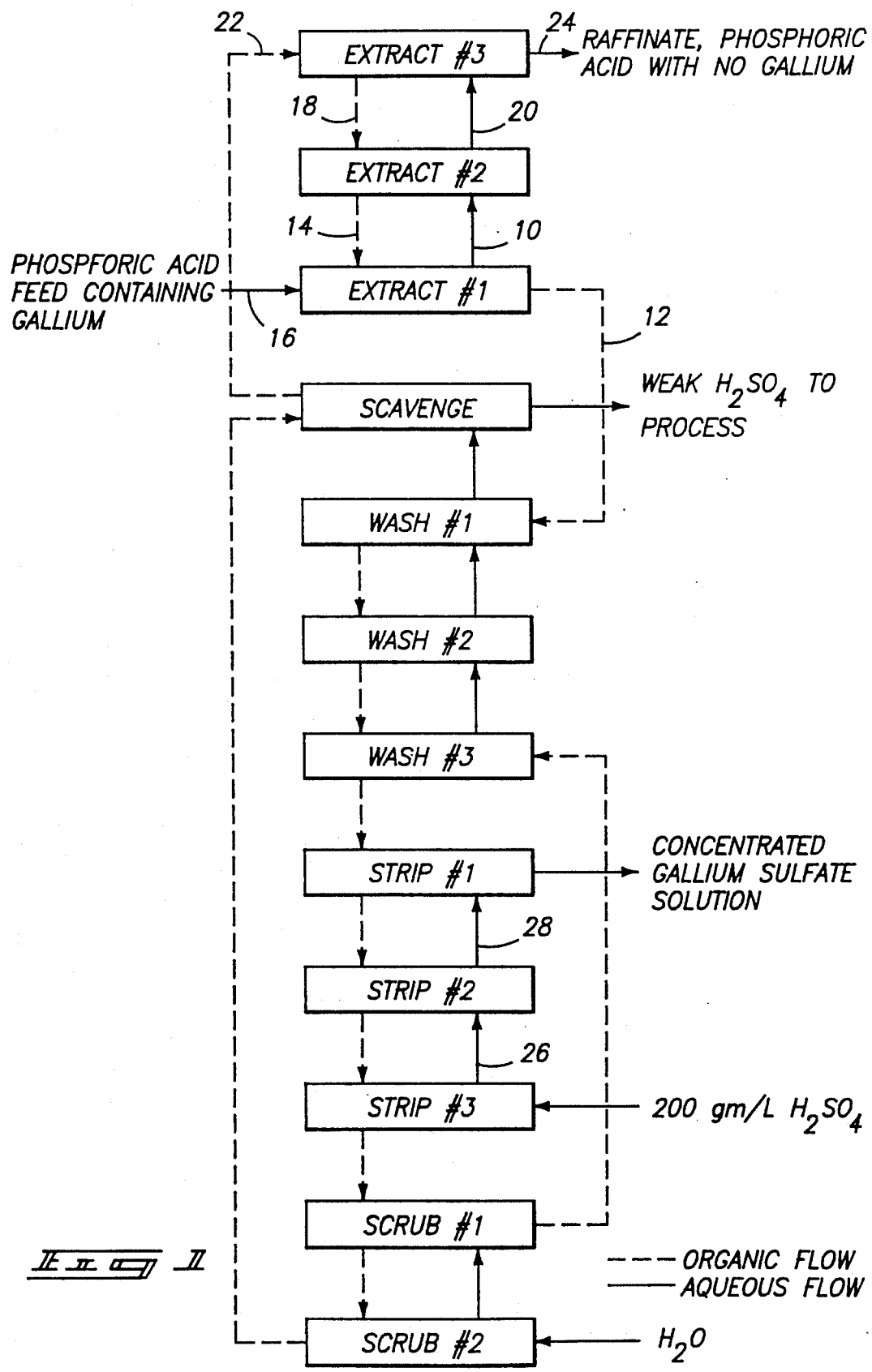

SOLVENT EXTRACTION OF GALLIUM FROM ACIDIC SOLUTIONS CONTAINING PHOSPHORUS

RELATED PATENT APPLICATION DATA

This patent resulted from a continuation-in-art application of U.S. patent application Ser. No. 07/692,246 of the same title which was filed on Apr. 26, 1991. The Ser. No. 07/692,246 was abandoned in favor of the patent application from which this patent matured.

TECHNICAL FIELD

This invention relates to processes for extracting gallium from aqueous gallium-bearing acidic solutions.

BACKGROUND OF THE INVENTION

Solvent extraction is used in industrial operations as a method to recover valuable metals. The means of implementing this technology is the availability of suitable metal extractants. These extractants are typically organic soluble complexes that allow the transfer of the metal values from an aqueous to the organic solution containing the extractant when the appropriate aqueous and organic solutions are brought into contact. In the course of this transfer, unwanted impurities, both metallic and non-metallic, depending upon the extractant and conditions employed, are left behind in the aqueous phase, thus separating them from the metal values. To recover these metal values from the organic solution, an aqueous stripping solution may be used. The nature and conditions used to strip the metal from the organic is dictated by the organic extractant and metal values of interest and should result in the purification and concentration of the metal values. The organic extractant is regenerated and recycled at the conclusion of the stripping process. The extraction/stripping process can be represented generally as follows:

$MA_{AQ} + E_{ORG} \rightarrow ME_{ORG} + A_{AQ}$      Extraction Cycle $ME_{ORG} + S_{AQ} \rightarrow MS_{AQ} + E_{ORG}$      Stripping Cycle $M$ = Metal $A_{AQ}$ = Aqueous solution originally containing metal values $E_{ORG}$ = Extractant in organic solution $S_{AQ}$ = Aqueous stripping solution It can be seen from this representation that the metal values move from the aqueous phase to the organic phase in the extraction cycle, then move back to the aqueous phase from the organic phase in the strip cycle. The metal values maya require further processing by conventional methods for complete recovery.

Solvent extraction processes for recovering metal values as described above are known. See, for example, Kirk-Othmer, Encyclopedia of Chemical Technology, Third Edition, Vol. 6, pp. 850-851, Vol. 9, pp. 713-714. Also, U.S. Pat. No. 3,224,873 issued, Dec. 21, 1965 to R. R. Swanson, discloses a solvent extraction process employing certain oxime extractants for the recovery of copper.

In particular, U.S. Pat. No. 3,971,843, issued Jul. 27, 1976 to J. Helgorsky et al., discloses a solvent extraction process employing certain substituted hydroxyquinolines for the recovery of gallium from alkaline aqueous solutions.

Recently, U.S. Pat. No. 4,741,887 issued May 3, 1988 to J. Coleman, et al., discloses a solvent extraction process employing certain N-organohydroxamic acids as extractants of gallium from acidic and alkaline aqueous solutions.

The recovery of gallium from sodium hydroxide solutions by solvent extraction using alkylated 8-hydroxyquinoline as the extractant was described by Sato and Oishi in Hydrometallurgy, 16, 315-324 (1989).

Judd and Arbuch, SME Publication #90-147 (1990), discuss the solvent extraction of gallium from sulfuric acid solutions using octyl phenyl acid phosphate (OPAP).

Gallium is a highly valued metal, with use in the electronic, photovoltaic, and laser industries, as well as having other technical uses. Aqueous solutions containing gallium metal values can be obtained from various sources, including zinc production process streams, alumina production process streams, and from the acid leaching of elemental phosphorous production flue gas residues, also know as "treater dust".

Other metal ions may be present in a gallium solution, often in large excess with respect to the gallium ion, depending on the source of the aqueous solutions. These other ions may include aluminum, zinc, iron, cadmium, potassium, and phosphorous. A successful commercial extractant must be capable of selectively extracting gallium in the presence of these competing ions. In addition, once the gallium is extracted onto the organic solution, it should easily be stripped into another aqueous solution in a concentrated form for further processing.

BRIEF DESCRIPTION OF THE DRAWING

Preferred embodiments of the invention are described below with reference to FIG. 1, which is a block diagram of a process for carrying out a method in accordance with the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of the invention, a process for extracting gallium from an aqueous gallium-bearing acidic solution comprises the following steps:

providing a quantity of phosphorus within the aqueous gallium-bearing solution, the phosphorus being provided in an aqueous soluble form and being substantially dissolved within the aqueous solution, the aqueous gallium-bearing solution having dissolved phosphorus defining a first aqueous phase;

intermixing the aqueous gallium-bearing solution having the quantity of aqueous soluble dissolved phosphorus with a first organic phase comprising a quantity of an alkylated 8-hydroxyquinoline;

separating the intermixed first aqueous phase and first organic phases into a second aqueous phase and a second organic phase, the quantities of aqueous soluble phosphorus and alkylated 8-hydroxyquinoline being effective to extract gallium from the aqueous gallium-bearing solution to provide a gallium concentration in the second organic phase which is greater than a gallium concentration in the first organic phase and to provide a gallium concentration in the second aqueous phase which is less than a gallium concentration in the first aqueous phase, the gallium concentration in the second organic phase being greater than if no aqueous soluble phosphorus were present in the first aqueous solution; and stripping gallium from the second organic phase with an acid solution.

Alkylated 8-hydroxyquinoline has been shown to extract gallium from alkaline aqueous solutions. Such can be purchased as "Kelex-100" from Sherex Chemical Company, and as "Lix-26" from Henkel Corporation. In this invention, alkylated 8-hydroxyquinoline is shown to also extract gallium from acidic aqueous solutions as long as those aqueous solutions contain phosphorous. The amount of phosphorus in the first or starting aqueous phase can be 100 mg/L or greater. Greatest results should be obtained at equivalent phosphorus concentrations which are greater than about 15,000 mg/L. Acidic aqueous solutions not containing phosphorus can have phosphorus added so as to allow the efficient extraction of gallium using alkylated 8-hydroxyquinoline. Solutions generated from the acid leaching of phosphate byproduct "treater dust", which already contain a sufficient quantity of phosphorus in the acidic aqueous solution, can be easily processed using alkylated 8-hydroxyquinoline as the selected extractant for gallium from these solutions. The phosphorus present under these and preferred conditions is as the acid $H_3PO_4$, with $PO_4^{-3}$ being the understood active phosphorus.

In order for the alkylated 8-hydroxyquinoline to be used as a liquid extractant, it must be dissolved in an organic solvent such as kerosene, hexane, toluene, methylene chloride, chloroform, or other aliphatic and aromatic hydrocarbons, such as Kermac-470B, Chevron ion exchange solvent, Solvesso 100 and the like. Such solvents must be substantially water immiscible in order to easily separate the organic from the aqueous solutions used during the extraction and stripping of gallium from these solutions. Generally, the amount of alkylated 8-hydroxyquinoline will be present in the first organic phase at a concentration of a least 4% by volume. Preferably, the alkylated 8-hydroxyquinoline will be present in the range of 4 to 40% by volume, and more preferably, abut 10 to 30% by volume of the first organic phase.

The organic may also contain modifiers, which are used to prevent third-phase formation, aid in phase separation, increase extractant solubility in the hydrocarbon solvent, and/or improve the efficiency or speed of the extraction. Examples of such modifiers include tributylphosphate (TBP), nonylphenol, methylisobutylketone (MIBK), octylphenyl acid phosphate (OPAP), and isodecanol. If a modifier is used it may be present in amounts of 0.5 to 50%, or greater, by volume of the first organic phase, and preferably about one-half the concentration of alkylated 8-hydroxyquinoline used in the solvent.

In this invention, liquid-liquid extraction may be preformed using mixer-settlers, pulse columns, columns employing rotating impellers, and the like. In a mixer-settler type of arrangement, the aqueous and organic phase are thoroughly dispersed with each other by means of stirring or some other suitable type of agitation. The solvent containing the alkylated 8-hydroxyquinoline as the extractant forms a complex with the gallium in the organic phase. The dispersion then flows to a settler where the aqueous and organic phases separate under quiescent conditions. The process may be carried out batchwise or continuously. Time of intermixing could be anywhere from 10 seconds to more than 10 minutes, with at least 4 minutes being preferred, and at least 10 minutes being most preferred.

The first aqueous phase to first organic phase volume ratio in the extraction cycle should be selected to most effectively transfer gallium from the aqueous to the organic while not requiring excessive amounts of chemicals or unduly difficult operating conditions. This ratio may be in the range of 1:20 to 20:1 (aqueous phase volume: organic phase volume), although other ratios may be effective, depending on the characteristics of the aqueous feed, the organic solvent, and the equipment used. Generally ratios closed to the 1:1 ratio are preferred, although the effective ratio may be changed through the recycling of one or the other of the phases.

A pH of 0.4 to 2.5 for the acidic aqueous solution was found to be the most effective for gallium extraction. In particular, a pH of 1.2 to 1.6 is preferred.

The solvent extraction of gallium using alkylated 8-hydroxyquinoline may generally be carried out a temperature in the range of 0° to 90° C., although more preferably preformed at temperatures between 20° and 80° C., with at least 60° C. being most preferred.

Also in accordance with this invention, weakly extracted metals such as iron can be crowded off the organic by loading the organic with increasingly higher concentrations of gallium, thus providing a more selective separation of gallium from these weakly extracted metals. This crowding is most prevalent when the organic is loaded almost to its maximum capacity with gallium. Such is best accomplished by conducting multiple intermixing and separating steps to displace the other metals on the alkylated 8-hydroxyquinoline with gallium, although such crowding can and does occur without the multiple steps.

Following the extraction of gallium into the organic to produce the second organic phase, it may be desirable to wash the loaded organic to remove entrained aqueous droplets and co-extracted metals that may interfere with the purity of the gallium in subsequent steps. This wash solution may consist of water, dilute acid (sulfuric, hydrochloric, phosphoric), or aqueous ammonia solutions.

Following the extraction of gallium into the organic and the subsequent washing to the organic, if so desired, the gallium now present in the organic can be stripped by contacting the loaded organic with an appropriate strip solution. Suitable strip solutions include solutions of mineral acids, such as sulfuric, hydrochloric, hydrofluoric, nitric, phosphoric, and similar acids. The preferred strip solution is sulfuric acid at a concentration of 50 to 400 gm per liter of solution and more preferably, a solution containing 150 to 250 gm of sulfuric acid per liter of solution. The physical conditions and equipment for stripping are similar to those used for the aforementioned extraction operation. The temperatures of stripping may range from 0° to 90° C., with the preferred range being between 40° to 80° C. The aqueous phase volume to organic phase volume ratio may be in the 1:20 to 20:1 range, but preferably, closer to the 1:1 range. There may also be internal recycling capability decreasing the effective aqueous-organic ratio to further concentrate gallium values in the strip solution.

The strip solution containing the gallium may be treated by conventional means to recover the gallium values. For example, the gallium may be precipitated as gallium hydroxide (Ga[OH]$_3$) by neutralization with sodium or potassium hydroxide or ammonium hydroxide. The precipitate is then redissolved in sodium or potassium hydroxide and gallium recovered in metallic form through electrowinning.

Due to the fact that alkylated 8-hydroxyquinoline also extracts acid from the acidic strip solution, the organic left from the strip operation may contain undesirable concentrations of acid. This acid may be removed from the organic using water, dilute caustic solutions, or the like, thus preparing the organic for return and reuse in the extraction operation.

EXAMPLE 1

Solvent extraction of gallium was carried out using synthetic acid aqueous solutions at pH 1.2 containing varying concentrations of phosphorus. The phosphorus was added to the aqueous solutions as phosphoric acid (H$_3$PO$_4$). The gallium concentration in the aqueous solution was approximately 600 mg/L. The organic phase consisted of 20% Lix-26 (extractant), 10% nonylphenol (a modifier), and 70% Kermac 470-B (a petroleum distillate solvent) with all percentages on a volume basis. Prior to use, the organic was washed with 100 gm/L sulfuric acid and then with water to remove any impurities. The extraction for gallium was carried out in a beaker using a magnetic stir bar to simulate agitation. The extractions were done at 60° C. with a 2-minute mix time, using equal volumes of aqueous and organic. After mixing, the phases were allowed to disengage and the samples were analyzed, as shown in Table 1.

TABLE 1

| Phosphorus Concentration (mg/L) | Gallium in Feed (mg/L) | Gallium in Raff. (mg/L) | % Ga Ext. |
| --- | --- | --- | --- |
| 0 | 610 | 554 | 9% |
| 156 | 600 | 534 | 11% |
| 334 | 610 | 496 | 19% |
| 501 | 600 | 463 | 23% |
| 1,700 | 593 | 391 | 34% |
| 17,500 | 610 | 29 | 95% |
| 88,000 | 644 | 16 | 98% |

As can be seen, addition of phosphorus greatly enhances the extraction of gallium.

EXAMPLE 2

Solvent extraction of gallium was carried out with an aqueous feed sample prepared from leaching phosphate "treated dust" with sulfuric acid. The aqueous feed solution contained 95,000 mg/L phosphorus, 543 mg/L gallium, 5,800 mg/L aluminum, 2,500 mg/L iron, 23,000 mg/L zinc, and 35,000 mg/L potassium. The organic phase consisted of 20% Lix-26 (extractant), 10% nonylphenol (a modifier), and 70% Kermac 470-B (a petroleum distillate solvent), with all percentages on a volume basis. Prior to use, the organic was washed with 100 gm/L sulfuric acid and then water to remove any impurities. The extractions were done at 60° C. using equal volumes of aqueous and organic and a pH of 1.3. The mixing apparatus was the same as employed in Example 1. After mixing, the phases were allowed to disengage and the samples were analyzed as shown in Table 2.

TABLE 2

| Time of Mixing (Sec.) | Gallium in Feed (mg/L) | Gallium in Raffinate (mg/L) | % Ga Extraction |
| --- | --- | --- | --- |
| 10 | 517 | 326 | 37 |
| 20 | 517 | 305 | 41 |
| 40 | 517 | 284 | 45 |
| 60 | 517 | 253 | 51 |
| 120 | 517 | 180 | 65 |
| 240 | 517 | 145 | 72 |
| 600 | 517 | 3 | 99 |

The results show that the transfer of gallium from the aqueous phase to the organic phase is rapid, with almost total gallium extraction at 600 seconds.

EXAMPLE 3

Solvent extraction was carried out according to the procedure of Example 2, with the exception that the time of mixing was consistently 2 minutes and the pH of the aqueous feed was varied. The aqueous feed was also filtered after each pH adjustment prior to extraction to remove any precipitate. Results are shown in Table 3.

TABLE 3

| pH | Gallium in Feed (mg/L) | Gallium in Raffinate (mg/L) | % Gallium Extraction |
| --- | --- | --- | --- |
| 0.4 | 418 | 333 | 20.3 |
| 0.6 | 433 | 333 | 23.1 |
| 0.8 | 440 | 329 | 25.2 |
| 1.0 | 429 | 280 | 34.7 |
| 1.2 | 407 | 236 | 42.0 |
| 1.6 | 395 | 260 | 34.2 |
| 2.0 | 283 | 117 | 58.7 |
| 2.4 | 121 | 26 | 78.5 |
| 3.0 | 18 | 0 | 100.0 |

It is shown that the most successful extraction occurs in the range of pH 1.0 to 1.6. The extraction was more efficient at higher pH's, but a large portion of the gallium had been removed by precipitation of gallium hydroxide. It is preferable the pH be below 1.6 as it is at 1.6 that gallium precipitation starts to occur.

EXAMPLE 4

Solvent extraction of gallium was carried out according to the procedure of Example 2, with the exception that the modifiers were varied. The organic phase consisted of 20% Lix-26, Kermac 470-B as the solvent, and used several different modifiers, with no modifier run as a control. The results are shown in Table 4.

TABLE 4

| Modifier Used | Gallium in Feed (mg/L) | Gallium in Raffinate (mg/L) | % Gallium Extracted |
| --- | --- | --- | --- |
| None | 410 | 311 | 24.1 |
| 10% Tributylphosphate | 410 | 280 | 31.7 |
| 10% Dibutylphosphonate | 410 | 322 | 21.5 |
| 10% Methylisobutylketone | 410 | 308 | 24.9 |
| 10% Lix-64N | 410 | 250 | 39.0 |
| 10% Isodecanol | 410 | 233 | 45.6 |
| 10% Octophenyl acid phosphate | 410 | 105 | 74.4 |
| 10% Nonylphenol | 410 | 202 | 50.7 |

As shown, some modifiers enhance the extraction of gallium, with isodecanol and nonylphenol providing the best enhancement. Octophenyl acid phosphate was also found to extract 11.6% of the phosphorus, 42.9% of the iron, and 27.8% of the zinc, thus losing the advantage of selectivity.

EXAMPLE 5

Solvent extraction of gallium was carried out according to the procedure of Example 2, except that concentrations of the Lix-26 extractant and modifier were varied and the mix time used was 10 minutes. The results are shown in Table 5.

TABLE 5

| Organic Composition | Gallium in Feed (mg/L) | Gallium in Raffinate (mg/L) | % Gallium Extracted |
|---|---|---|---|
| 2% Lix-26, 1% Nonylphenol, 97% Kermac 470-B | 533 | 532 | 0 |
| 4% Lix-26, 2% Nonylphenol, 94% Kermac 470-B | 533 | 472 | 11.4 |
| 8% Lix-26, 4% Nonylphenol, 88% Kermac 470-B | 533 | 123 | 76.9 |
| 16% Lix-26, 8% Nonylphenol, 76% Kermac 470-B | 533 | 9.8 | 98.2 |
| 20% Lix-26, 10% Nonylphenol, 70% Kermac 470-B | 533 | 2.7 | 99.5 |

It is shown that increasing the concentration of Lix-26 offers enhanced extraction of gallium.

EXAMPLE 6

Solvent extraction of gallium was carried out according to the procedure of Example 2, except that the mix time was 2 minutes and the temperature of extraction was varied. The results are shown in Table 6.

TABLE 6

| Temperature (0° C.) | Gallium in Feed (mg/L) | Gallium in Raffinate (mg/L) | % Gallium Extraction |
|---|---|---|---|
| 20 | 507 | 467 | 7.9 |
| 30 | 507 | 463 | 8.7 |
| 40 | 507 | 450 | 11.2 |
| 60 | 507 | 169 | 66.7 |

TABLE 6-continued

| Temperature (0° C.) | Gallium in Feed (mg/L) | Gallium in Raffinate (mg/L) | % Gallium Extraction |
|---|---|---|---|
| 80 | 507 | 29 | 94.3 |

As this example shows, operating at a temperature of 60° C. and above for this type of aqueous solution will benefit the gallium extraction.

EXAMPLE 7

Solvent extraction of gallium was carried out according to the procedure of Example 2, except the extraction was carried out with a 2-minute mix time. The gallium-loaded organic was washed twice with deionized water prior to stripping with various concentrations of sulfuric acid. The results of this washing and stripping are shown in Table 7.

TABLE 7

| Sample | Fe | P | Cd | Al | Zn | Pb | K | Ga | % Ga Extracted | % Ga Stripped |
|---|---|---|---|---|---|---|---|---|---|---|
| Feed | 2,447 | 106,000 | 99 | 6,239 | 12,450 | 11 | 330,000 | 494 | — | — |
| Raffinate | — | — | — | — | — | — | — | 75 | 84.8 | |
| Wash 1 | 0 | 957 | 0 | 56 | 116 | 0 | 240 | | | |
| Wash 2 | 0 | 18 | 0 | 0 | 2 | 0 | 5 | 0 | | |
| Strip with 100 g/l H$_2$SO$_4$ | 34 | 0 | 0 | 5.6 | 14 | 0 | 0 | 1.8 | — | 0 |
| Strip with 150 g/l H$_2$SO$_4$ | 261 | 0 | 0 | 5.7 | 14 | 0 | 0 | 46 | — | 11.0 |
| Strip with 200 g/l H$_2$SO$_4$ | 410 | 0 | 0 | 6.5 | 14 | 0 | 0 | 177 | — | 42.2 |

This example shows that gallium is stripped using higher concentrations of sulfuric acid. The results also show the selectivity of gallium over the other extraction metals in solution. As shown, there is essentially no extraction of phosphorus, cadmium, lead, or potassium. There is slight extraction of aluminum and zinc. Iron, however, is shown to extract and strip with gallium and therefore will be the largest impurity. The ratio of gallium to iron, however is good, going from 0.20:1 in the leach solution to 0.43:1 in the strip solution.

EXAMPLE 8

This example was done to show that when the solvent is increasingly loaded with gallium, weakly extracted metals will be crowded off. This was carried out according to the procedure of Example 2, except a synthetic acidic aqueous gallium solution was used and the extraction was done one time. In the other test, the extraction was done fifteen times; each time loading more gallium on the solvent. Both loaded solvents were then washed twice with water for 2 minutes at 60° C., and then stripped with 200 gm/L sulfuric acid. The results are shown in Table 8.

TABLE 8

| Sample | Fe | P | Cd | Al | Zn | Pb | K | Ga | Ga:Fe | Ga:Al | Ga:Zn |
|---|---|---|---|---|---|---|---|---|---|---|---|
| Test #1 1 Extraction | | | | | | | | | | | |
| Feed | 1052 | 101,600 | 26 | 1768 | 1946 | 3 | 8446 | 1656 | 1.57 | 0.94 | 0.85 |
| Wash #1 | 0 | 1,627 | .33 | 30 | 28 | 0 | 155 | 0 | — | — | — |
| Wash #2 | 0 | 32 | 0 | 0 | 2 | 0 | 3 | 0 | — | — | — |
| Strip #1 | 156 | 2.5 | 0 | 2.8 | 1.3 | 0 | 1.0 | 977 | 6.26 | 348.9 | 751.5 |
| Test #2 15 Extractions | | | | | | | | | | | |

TABLE 8-continued

| Sample | Analysis (mg/L) | | | | | | | | Ratio | | |
|---|---|---|---|---|---|---|---|---|---|---|---|
| | Fe | P | Cd | Al | Zn | Pb | K | Ga | Ga:Fe | Ga:Al | Ga:Zn |
| Wash #1 | 0 | 2,000 | 1.7 | 103 | 263 | 0 | 440 | 0 | — | — | — |
| Wash #2 | 0 | 73 | 0 | 3 | 9 | 0 | 20 | 0 | — | — | — |
| Strip #1 | 33 | 1.3 | 0 | 3 | 0 | 0 | 3 | 2844 | 861.8 | 948.0 | — |

This showed that as more gallium was loaded onto the solvent, less iron was loaded. The ratio of Ga:Fe went from 6.26:1 in the first strip test to 861.8:1 in the second strip test. Also, iron in the strip solutions decreased from 156 mg/L to 33 mg/L.

It is theorized that the extraction of the invention using only substituted 8-hydroxyquinoline is as follows:

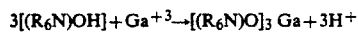

$$3[(R_6N)OH] + Ga^{+3} \rightarrow [(R_6N)O]_3 Ga + 3H^+$$

Fig. 1 illustrates a preferred process involving multiple extraction passes, multiple washes, multiple strippings and scrubbings, such as alluded to in some of the above examples. Such is expected to further maximize gallium recovery and result in recycle of organic phases. The illustrated Extract #s 1, 2, and 3 extract gallium from the phosphoric acid solution in a counter-current flow system. The following are representative examples of the removal rates believed to be possible, assuming a phosphoric acid feed containing gallium at 500 ppm. Extract #1 includes two exit flow lines 10 and 12. Line 10 would comprise the aqueous phase having reduced gallium, wherein line 12 would comprise the organic phase having enriched gallium. A gallium enriched organic stream 14 would be fed to Extract #1, with the phosphoric acid and gallium feed being provided to Extract #1 via a flow line 16. Line 14 feeds to Extract #1 from Extract #2, with line 10 from Extract #1 feeding to Extract #2. Likewise, a flow line 18 supplies organic to Extract #2 from Extract #3, while a flow line 20 provides aqueous flow from Extract #2 to Extract #3. Recycled organic is fed to Extract #3 via flow line 22, with phosphoric acid with essentially no gallium being drawn from the process through line 24.

Line 14 is expected to have gallium concentration at 250 ppm, while line 10 is expected to have reduced gallium concentration of 250 ppm. Line 18 is expected to have gallium concentration of 100 ppm, while line 20 is expected to have gallium concentration of 100 ppm. Essentially no gallium will be in the organic recycle feed line 22. Gallium concentration in organic line 12 should be approximately 500 ppm.

The three wash sequence illustrated is where entrained and weakly extracted metals, such as phosphorus, zinc, iron, etc., are washed from the organic using a weak $H_2SO_4$ solution. The concentration of this weak $H_2SO_4$ solution depends on the amount of $H_2SO_4$ extracted by the organic during gallium stripping and subsequently scrubbed from the organic using water. Such concentration is expected to be about 10 to 25 gm/L. The counter flowing weak sulfuric acid is fed from Wash #1 to the illustrated Scavenge tank where any gallium which may be stripped using the weak acid wash is extracted by the fresh scrubbed organic exiting from Scrub #2. The weak $H_2SO_4$ from the scavenge is sent to an acid leach process external to the process depicted by the FIGURE.

The washed organic is fed from Wash #3 to a series of Strips #1, #2 and #3 where gallium is stripped from the organic into a strong 200 gm/L $H_2SO_4$ solution. Line 26 exiting from Strip #3 is expected to have a gallium concentration of about 2,000 ppm. Line 28 exiting from Strip #2 and feeding to Strip #1 is expected to have a gallium concentration of 10,000 ppm. The concentrated gallium sulfate solution exiting from Strip #1 is expected to have a concentration of approximately 50,000 ppm gallium.

Organic exiting Strip #3 is fed to Scrub #1 and #2 where the acid which is extracted by the organic is scrubbed from the organic using fresh water, and results in a weak $H_2SO_4$ solution which is utilized for washing the organic in Wash #1, #2 and #3 above. Organic exiting Scrub #2 is fed to the Scavenge where it is combined with weak $H_2SO_4$ exiting from Wash #1. Organic exiting therefrom is fed to Extract #3.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the prior scope of the appended claims appropriately interpreted in accordance with the doctrine of equivalents.

We claim:

1. A process for extracting gallium from an aqueous gallium-bearing acidic solution comprising the following steps:

providing phosphorus within the aqueous gallium-bearing solution, the phosphorus being provided in an aqueous soluble form and being substantially dissolved within the aqueous solution, the aqueous gallium-bearing solution having dissolved phosphorus defining a first aqueous phase;

intermixing the aqueous gallium-bearing solution having the aqueous soluble dissolved phosphorus with a first organic phase comprising an alkylated 8-hydroxyquinoline;

separating the intermixed first aqueous phase and first organic phases into a second aqueous phase and a second organic phase, the aqueous soluble phosphorus and alkylated 8-hydroxyquinoline being effective to extract gallium from the aqueous gallium-bearing solution to provide a gallium concentration in the second organic phase which is greater than a gallium concentration in the first organic phase and to provide a gallium concentration in the second aqueous phase which is less than a gallium concentration in the first aqueous phase, the gallium concentration in the second organic phase being greater than if no aqueous soluble phosphorus were present in the first aqueous solution; and stripping gallium from the second organic phase with an acid solution.

2. The process for extracting gallium from an aqueous gallium-bearing acidic solution of claim 1 wherein the quantity of phosphorus in the first aqueous phase is at least 100 mg/L of equivalent elemental phosphorus.

3. The process for extracting gallium from an aqueous gallium-bearing acidic solution of claim 1 wherein the quantity of phosphorus in the first aqueous phase is at least 1000 mg/L of equivalent elemental phosphorus.

4. The process for extracting gallium from an aqueous gallium-bearing acidic solution of claim 1 wherein the first organic phase comprises a substantially water immiscible organic solvent, the quantity of alkylated 8-hydroxyquinoline in the first organic phase being from about 4% to about 40% by volume of the first organic phase.

5. The process for extracting gallium from an aqueous gallium-bearing acidic solution of claim 1 wherein the first aqueous phase and first organic phase are provided in a volumetric ratio of aqueous to organic of from about 1:20 to about 20:1 during such intermixing.

6. The process for extracting gallium from an aqueous gallium-bearing acidic solution of claim 1 wherein the first aqueous phase and first organic phase are provided in a volumetric ratio of aqueous to organic of about 1:1 during such intermixing.

7. The process for extracting gallium from an aqueous gallium-bearing acidic solution of claim 1 wherein the aqueous soluble phosphorus and alkylated 8-hydroxyquinoline are effective to initially incorporate other metal onto the alkylated 8-hydroxyquinoline, the other metal being one or more of the metals of the group consisting of iron, phosphorus, cadmium, aluminum, zinc, lead and potassium, the process further comprising displacing the other metal on the alkylated 8-hydroxyquinoline with gallium.

8. The process for extracting gallium from an aqueous gallium-bearing acidic solution of claim 1 wherein,
the quantity of phosphorus in the first aqueous phase is at least 100 mg/L of equivalent elemental phosphorus;
the first organic phase comprises a substantially water immiscible organic solvent, the quantity of alkylated 8-hydroxyquinoline in the first organic phase being from about 4% to about 40% by volume of the first organic phase; and
the first aqueous phase and first organic phase are provided in a volumetric ratio of aqueous to organic of from about 1:20 to about 20:1 during such intermixing.

9. The process for extracting gallium from an aqueous gallium-bearing acidic solution of claim 1 wherein the aqueous soluble phosphorus is present in the first aqueous phase as $H_3PO_4$.

10. The process for extracting gallium from an aqueous gallium-bearing acidic solution of claim 1 wherein,
the quantity of phosphorus in the first aqueous phase is at least 1000 mg/L of equivalent elemental phosphorus, with the aqueous soluble phosphorus being present in the first aqueous phase as $H_3PO_4$;
the first organic phase comprises a substantially water immiscible organic solvent, the quantity of alkylated 8-hydroxyquinoline in the first organic phase being from about 4% to about 40% by volume of the first organic phase; and
the first aqueous phase and first organic phase are provided in a volumetric ratio of aqueous to organic of from about 1:20 to about 20:1 during such intermixing.

11. The process for extracting gallium from an aqueous gallium-bearing acidic solution of claim 1 wherein the first aqueous and first organic phases are intermixed relative to each other for a time period of greater than 10 seconds.

12. The process for extracting gallium from an aqueous gallium-bearing acidic solution of claim 1 wherein the first aqueous and first organic phases are intermixed relative to each other for a time period of at least about 4 minutes.

13. The process for extracting gallium from an aqueous gallium-bearing acidic solution of claim 1 wherein the first aqueous and first organic phases are intermixed relative to each other for a time period of at least about 10 minutes.

14. The process for extracting gallium from an aqueous gallium-bearing acidic solution of claim 1 wherein the first aqueous and first organic phases are intermixed at fluid temperatures of from about 20° C. to about 80° C.

15. The process for extracting gallium from an aqueous gallium-bearing acidic solution of claim 1 wherein the first aqueous and first organic phases are intermixed at fluid temperatures of at least about 60° C.

16. The process for extracting gallium from an aqueous gallium-bearing acidic solution of claim 1 further comprising providing an organic modifier in the first organic phase.

17. The process for extracting gallium from an aqueous gallium-bearing acidic solution of claim 1 further comprising providing an organic modifier in the first organic phase, the organic modifier being at least one of isodecanol or nonylphenol.

18. The process for extracting gallium from an aqueous gallium-bearing acidic solution of claim 1 wherein the acidic first aqueous phase has a pH of from about 0.4 to about 2.5.

19. The process for extracting gallium from an aqueous gallium-bearing acidic solution of claim 1 wherein the steps of intermixing and separating are conducted in multiple intermixing and separating steps.

20. The process for extracting gallium from an aqueous gallium-bearing acidic solution of claim 1 wherein the step of stripping gallium from the second organic phase with an acid solution is conducted in multiple stripping steps.

21. The process for extracting gallium from an aqueous gallium-bearing acidic solution of claim 1 wherein,
the steps of intermixing and separating are conducted in multiple intermixing and separating steps; and
the step of stripping gallium from the second organic phase with an acid solution is conducted in multiple stripping steps.

22. The process for extracting gallium from an aqueous gallium-bearing acidic solution comprising the following steps:.
providing phosphorus at a concentration of at least 10,000 mg/L within the aqueous gallium-bearing solution, the phosphorus being provided in an aqueous soluble form as $H_3PO_4$ and being substantially dissolved within the aqueous solution, the aqueous gallium-bearing solution having dissolved phosphorus defining a first aqueous phase, the acidic first aqueous phase having a pH of from about 1.2 to about 1.6;
intermixing the aqueous gallium-bearing solution having the aqueous soluble dissolved phosphorus with a first organic phase at a volumetric ratio of aqueous to organic of about 1:1 during such intermixing, the first organic phase comprising a substantially water immiscible organic solvent and an alkylated 8-hydroxyquinoline, the alkylated 8-hydroxyquinoline being provided in the first organic phase at a concentration of from about 10% to about 30% by volume of the first organic phase, maintaining a fluid temperature of at least 60° C. during such intermixing and conducting such intermixing for at least 4 minutes;

separating the intermixed first aqueous phase and first organic phases into a second aqueous phase and a second organic phase, the concentration of aqueous soluble phosphorus and alkylated 8-hydroxyquinoline being effective to extract gallium from the aqueous gallium-bearing solution to provide a gallium concentration in the second organic phase which is greater than a gallium concentration in the first organic phase and to provide a gallium concentration in the second aqueous phase which is less than a gallium concentration in the first aqueous phase, the gallium concentration in the second organic phase being greater than if no aqueous soluble phosphorus were present in the first aqueous solution; and stripping gallium from the second organic phase with an acid solution.

* * * * *